United States Patent [19]

Narusawa

[11] Patent Number: 4,907,072
[45] Date of Patent: Mar. 6, 1990

[54] MOSAIC PICTURE GENERATION CIRCUIT

[75] Inventor: Sadayuki Narusawa, Hamamatsu, Japan

[73] Assignee: Yamaha Corporation, Hamamatsu, Japan

[21] Appl. No.: 262,284

[22] Filed: Oct. 25, 1988

[30] Foreign Application Priority Data

Oct. 27, 1987 [JP] Japan .................. 62-270572

[51] Int. Cl.⁴ ............................. H04N 9/74
[52] U.S. Cl. ........................................ 358/22
[58] Field of Search ........................... 358/22

[56] References Cited

U.S. PATENT DOCUMENTS 4,134,128  1/1979  Hurst ..................................... 358/22
4,782,388 11/1988  Lake ...................................... 358/22

FOREIGN PATENT DOCUMENTS 46366  4/1981  Japan ..................................... 358/22

Primary Examiner—John W. Shepperd
Attorney, Agent, or Firm—Spensley Horn Jubas & Lubitz

[57] ABSTRACT

A mosaic picture generation circuit for reproducing a color television signal in a mosaic fashion on a television display comprises a circuit for writing an analog-to-digital converted signal of a composite video signal in a memory, a circuit for reading out data of one wave of color burst to be repeated in each mosaic block each time the block is scanned, a circuit for repeatedly outputting the read out data on the same scanning line in the same block, a circuit for shifting the output data in the same block by half wave of color burst every other scanning line, a circuit for replacing data of half wave of first color burst on a scanning line on which the shifting is not made with former half data of one wave of color burst to be repeated in an immediately preceding block, and a circuit for delivering out the output data after digital-to-analog conversion. A mosaic picture can be produced by using a composite video signal without any previous processing so that a clear mosaic picture free from irregularity can be produced with a simplified circuit construction.

3 Claims, 4 Drawing Sheets

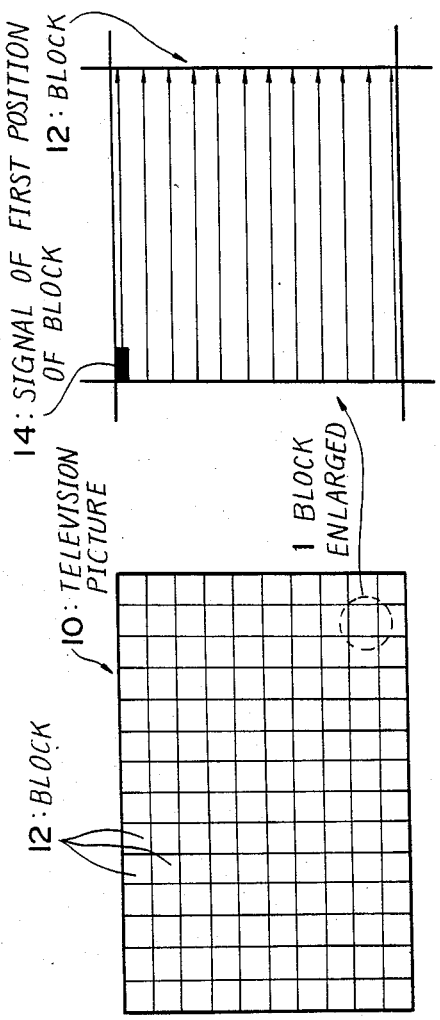
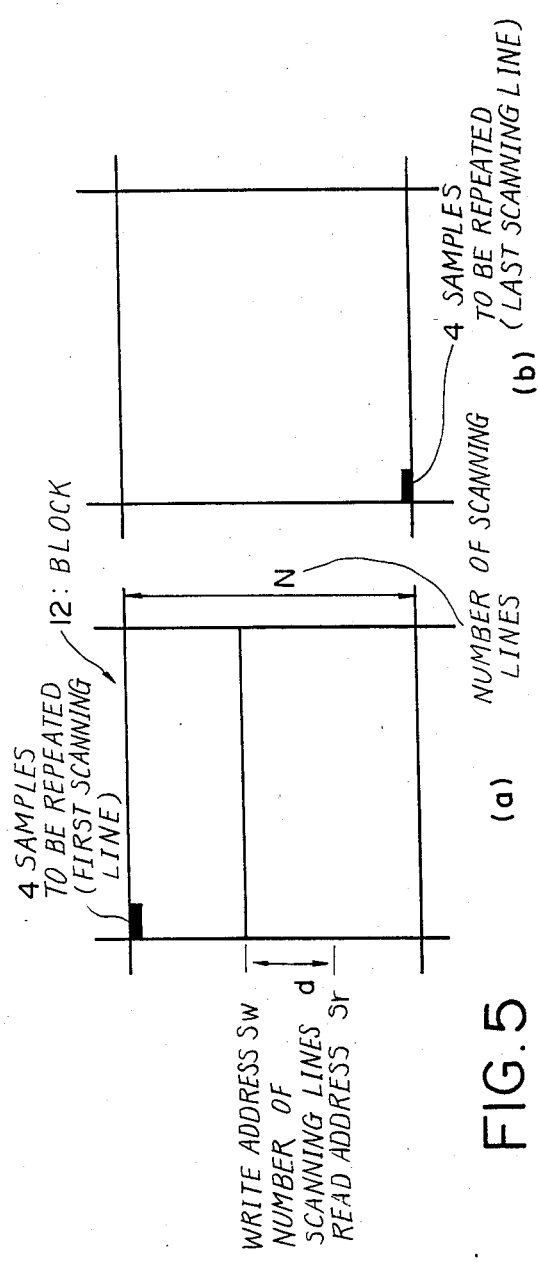
FIG. 2
FIG. 5

MOSAIC PICTURE GENERATION CIRCUIT

BACKGROUND OF THE INVENTION

This invention relates to a mosaic picture generation circuit for reproducing a color television signal as that of LV(laser-vision disc), CDV(Compact Disc vision), VTR, television or the like in a mosaic fashion on a television display, which is capable of storing a composite video signal in a memory without any processing and thereby generating a clear mosaic picture free from iregurarity with simple construction.

In recent LV players, there is an LV player which has a mosaic picture generation function as a special playback function for reproducing a signal in a mosaic fashion on a television display.

This mosaic picture generation function, as shown in FIG. 2, is obtained by dividing a television picture 10 in plural blocks 12 in a mosaic fashion, storing a television signal in a memory, and having a suitable signal, for example, a signal 14 located in first position in each block, generated repeatedly in the block, and filling out the block with a single picture by the signal 14.

Generation of such a mosaic picture has been made by YC-separating a composite video signal into a luminance signal and a chrominance signal and controlling the respective component signals to memorize them in a memory and read them out of the memory.

In case that the generation processing is made by separating the composite signal into the component signals as in the prior art device, however, there is needed a construction to separate luminance and chrominance signals, and thereupon to synthesize the two signals which have been read out individually from the memory to produce the composite video signal, so that the construction to reproduce a picture tends to become complicated.

It is, therefore, an object of the invention to provide a mosaic picture generation circuit capable of generating a mosaic picture by memorizing the composite video signal as it is, i.e., without any previous processing thereof.

SUMMARY OF THE INVENTION

A mosaic picture generation circuit achieving the above described object of the invention comprises means for writing an analog-to-digital converted signal of a composite video signal in a memory, means for reading out data of one wave of color burst to be repeated in each mosaic block each time said block is scanned, means for repeatedly outputting the read out data on the same scanning line and in the same block, means for shifting the output data in the same block by half wave of color burst every other scanning line, means for replacing data of half wave of first color burst on a scanning line on which said shifting is not made with former half data of the data of one wave of color burst to be repeated in an immediately preceding block, and means for delivering out the output data after digital-to-analog conversion.

In memorizing a color television signal as a composite video signal as it is and generating a mosaic picture, there exist the following problems which are respectively coped with in the manner described.

(1) If a single sample of the compsitot video signal is reproduced repeatedly, a color cannot be reproduced. That is because a chrominance signal is expressed by a phase based on a color burst which can not be determined based on the single sample.

Therefore, according to this invention, reproduction of a color is realized by reading out data (4 samples in the embodiment described later) for one wave of color burst to be repeated in each block from a memory and outputting it repeatedly.

(2) In adjacent scanning lines in a field, phase of a carrier chrominance signal is inverted by 180 degrees from each other to average a change in luminance. If, therefore, data of a certain scanning line is reproduced as it is in each scanning line in the block, color inversion and color irregularity will be caused at each scanning line.

As a method for preventing this problem, there is one according to which by reproducing data of two adjacent scanning lines as one unit repeatedly in the block, each data is reproduced only in scanning lines which are the same in phase as the data.

In this method, however, if the color is changed at the border of two adjacent scanning lines, change in the color occurs in each scanning line and a stripe is thereby produced in the block.

According to this invention, therefore, instead of using the data of the two scanning lines, the color inversion is prevented by shifting data produced in the same block by half wave of the color burst (180 degrees) at every other scanning line. Further, as data-proccessing is made for half wave of the color burst as described above, a sampling number for one wave of the color burst must be even.

(3) When the data is shifted for half wave of the color burst at every other scanning line, as described in (2), the picture is correspondingly shifted, and the border line of the block in the lateral direction is reproduced with notches.

According to the invention, these notches are removed by replacing the data for half wave of the first color burst located in the scanning line at which shifting is not made with former half data of one wave of repeated color burst of the immediately preceding block.

According to the invention employing the above described construction, by using a composite video signal, a mosaic picture which is clear and free from irregurality can be generated. Further, according to the invention, the circuit of the prior art device for separating a signal into a luminance signal and a chrominance signal, memorizing and proccessing them separating becomes unneccessary, so that the construction of the circuit can be simplified.

The embodiment of the invention will now be described with reference to the accompanying drawing.

BRIEF DESCRIPTION OF THE DRAWINGS

In the accompanying drawing,

FIG. 2 is a diagram showing the principle of producing a mosaic picture;

FIG. 5 is a diagram for explaining the operation of a phase difference detection circuit 50 of FIG. 1.

DESCRIPTION OF A PREFERED EMBODIMENT

Figure 1:
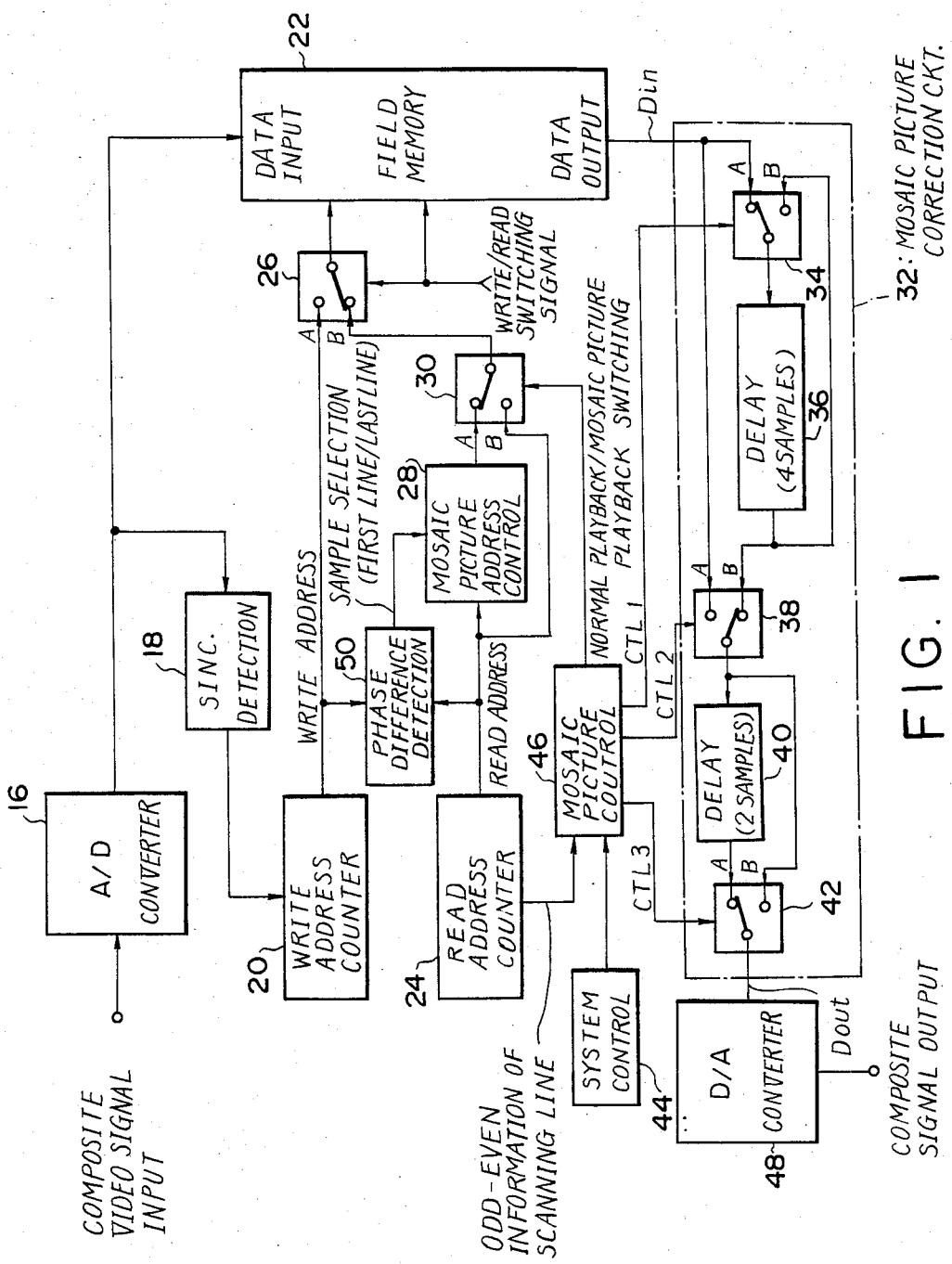
FIG. 1 is a block diagram showing an embodiment of the invention.

An embodiment of the invention is shown in FIG. 1.

This embodiment can be applied to such television signals as signals LV, CDV, VTR etc. In this embodiment also, a regular playback mode and a mosaic picture playback mode are switched therebetween by operation of a switch.

A composite video signal whose jitter has been accurately removed by a TBC (time base correction processor) is converted to a digital signal by an analog-to-digital converter 16. In this embodiment, 4 sample data are applied for a time length corresponding to one wave of color burst, so that a sampling frequency in this embodiment is determined at a frequency four times as high as the color burst, i.e., $3.58 \text{ MHz} \times 4 = 14.32 \text{ MHz}$.

The analog-to-digital converted data is applied to a synchronization detection circuit 18 and a vertical synchronizing signal as well as a horizontal synchronizing signal are detected therein. A write address counter 20 counts a write address of a field memory 22 based on this synchronization detection. This write address is constructed of a scanning line number and a number which shows position of the sample on the respective scanning line.

The field memory 22 which has capacity of storing composite video data for one field writes the composite video data which is sequentially supplied thereto over data of a previous field, controlling the write address in accordance with a command from the write address counter 20.

A read address counter 24 used for counting a read address of the field memory 22 sequentially produces a scanning line number and a number which shows position of the sample on the respective scanning line at the sampling frequency of the analog-to-digital converter 16 (14.32 MHz).

A mosaic picture address control 28 is used for counting the readout address of the field memory 22 based on the count of the read address counter 24 so as to generate a mosaic picture. As a mosaic picture is produced by filling out a divided block with the picture of the signal which represents the block, the mosaic picture address control 28 detects the block to which the scanning line number determined by the read address counter 24 belongs, and provides a scanning line number representing the detected block (in this embodiment, the first scanning line or the last scanning line of the block). Whether the first scanning line or the last scanning line of the block is used is determined by a phase difference detection circuit 50 according to a difference between the write address and the read address (details thereof will be described later). In read out information, information showing the position of the sample on the scanning line is produced as it is.

A switch 30 is used for switching the read address signal between the nomal playback mode and the mosaic picture playback mode. That is, in the nomal playback mode, the switch 30 is connected to a contact B, selects the output of the read address counter 24, and in the mosaic picture playback mode, the switch is connected to a contact A and selects the output of the mosaic picture address control 28.

In the field memory 22, the write mode and the read mode are switched by the write/read switching signal. An address changing switch 26 is operated by the write/read switching signal so that the write address and the read address are switched. In this way, when one sample is read out from the field memory 22, another sample is written in the field memory 22. In the field memory 22, in the nomal playback mode, the read address is sequentially proccessed by the read address signal from the read address counter 24, whereas in the mosaic picture mode, the address of the first (or the last) scanning line of the block to which the read address signal from the read address counter 24 belongs is repeatedly selected and read out.

The data read out from the field memory 22 is applied to a mosaic picture correction circuit 32. The mosaic picture correction circuit 32 executes, in the mosaic picture playback mode, (a) operation to produce repeatedly the data of the first 4 samples, which corresponds to one wave of the color burst, of the first or the last scanning line of the block read out of the field memory 22; (b) operation to shift the data by 2 samples, which corresponds to half wave of the color burst, at every other scanning line to prevent the color inversion in an adjacent scanning line; (c) operation to replace the first 2 samples of the scanning line at which shifting is not made with the former half of data corresponding to one wave of repeated color burst of the immediately preceding block to prevent occurrence of notches at the border of the block caused by the 2 sample shifting.

Among these operations, the operation (a) is performed by a 4-sample delay circuit 36 and a switching operation of a switch 34. The operation (b) is performed by a 2-sample delay circuit 40 and a switching operation of a switch 42. The operation (c) is performed by a switching operation of a switch 38.

Figure 3:
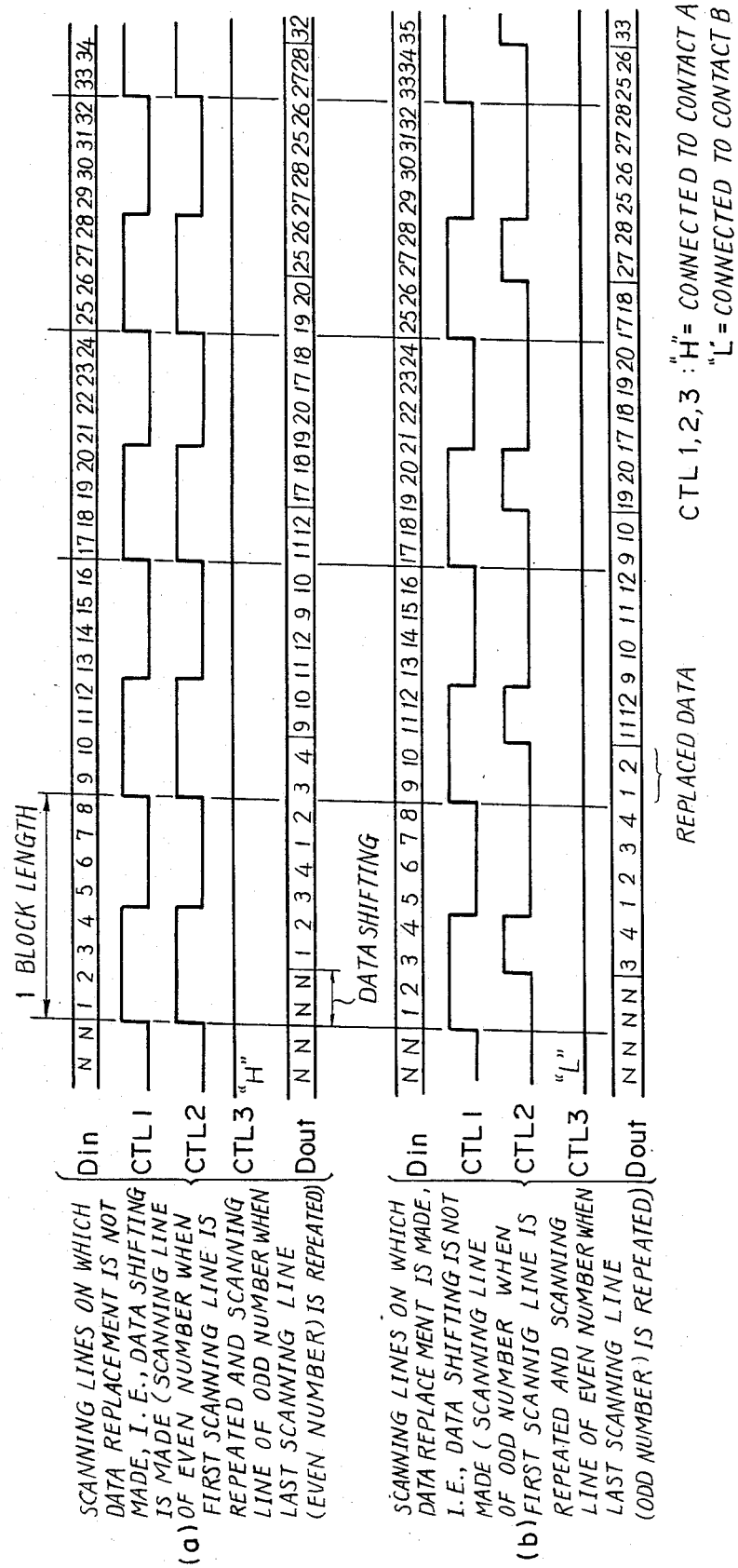
FIG. 3 is a time chart of control signals CTL1, CTL2 and CTL3 of FIG. 1.

The switch 34, 38, 42 are operated by switching signals CTL1, CTL2 and CTL3 produced from a mosaic picture control 46 in response to a command from a system control 44 (microcomputer). FIG. 3 shows a time chart of the switching signals CTL1, CTL2 and CTL3. The switches 34, 38 and 42 are connected to a contact A when the switching signals CTL1, CTL2 and CTL3 "H", and they are connected to a contact B when the switching signals CTL1, CTL2 and CTL3 are "L". The present embodiment is shown on the assumption that a length of one block in horizontal direction corresponds to a length of 8 samples, and the data of the first 4 samples in each block is repeated only once. Din designates the sample number of the first or the last scanning line of the block read out of the field memory 22, and Dout designates the sample number provided from the mosaic picture correction circuit 32.

In the scanning line where the data substitution is not executed, i.e. where the data shifting in executed, the operation (a) is performed, and in the scanning line where the data substitution is executed, i.e. where the data shifting is not executed, the operation (b) is performed. The switching between the operation (a) and (b) is executed based on odd-even information of the scanning line produced by the read address counter 24. When the number of the scanning lines in one block is even, in case the first scanning line is repeated, the operation (a) is executed in the scanning line of an even number whereas in case the last scanning line (the scanning line of even number) is repeated, it is executed in the scanning line of an odd number. The operation (b) is performed in reverse relationship to the operation (a).

In the operation (a), the time switch 34 is connected to the contact A for a time length corresponding to the first 4 samples of the block and the data of the first or the last 4 samples of the block is applied from the field memory 22 through the switch 34. The switch 38 is at the same time connected to the contact A during the 4 samples after the block is started, so that the data is shifted by 2 samples by the delay circuit 40 to be delivered out through the switch 42. The data of 4 samples is delayed by 4 samples by the delay circuit 36. The switch 38 is connected to the contact B upon elapse of 4 samples after the block is started, and this delayed data of 4 samples is produced and repeated only once. In the next block, new data of 4 samples is applied from the field memory 22 and the same process is executed. In this manner, the data of the first 4 samples of the block is repeated only once in each block, and, at the same time, the whole data is provided after being shifted by 2 samples.

In the operation (b), the switch 34 is connected to the contact A for a time length corresponding to the first 4 samples and the data of the first 4 samples of the block is applied from the field memory 22 through the switch 34.

This data of 4 samples is applied also to the delay circuit 36 and repeated only once. Since the operation of the switch 38 is delayed by 2 samples and the switch 38 is connected to the contact A only by 2 samples and connected thereafter to the contact B, an output of the switch 38 becomes the output whose first 2 samples of the block is replaced with the former half of the repeated data of the immediately preceding block. The output data provided from the switch 38 is not shifted in the 2 sample delay circuit 40 but delivered out as it is through the contact B of the switch 42.

The output Dout of the mosaic picture correction circuit 32 is provided after being converted to an analog signal by a digital-to-analog converter 48, and applied to a TV receiver where a mosaic picture is reproduced.

Figures 4A, 4B, 4C:
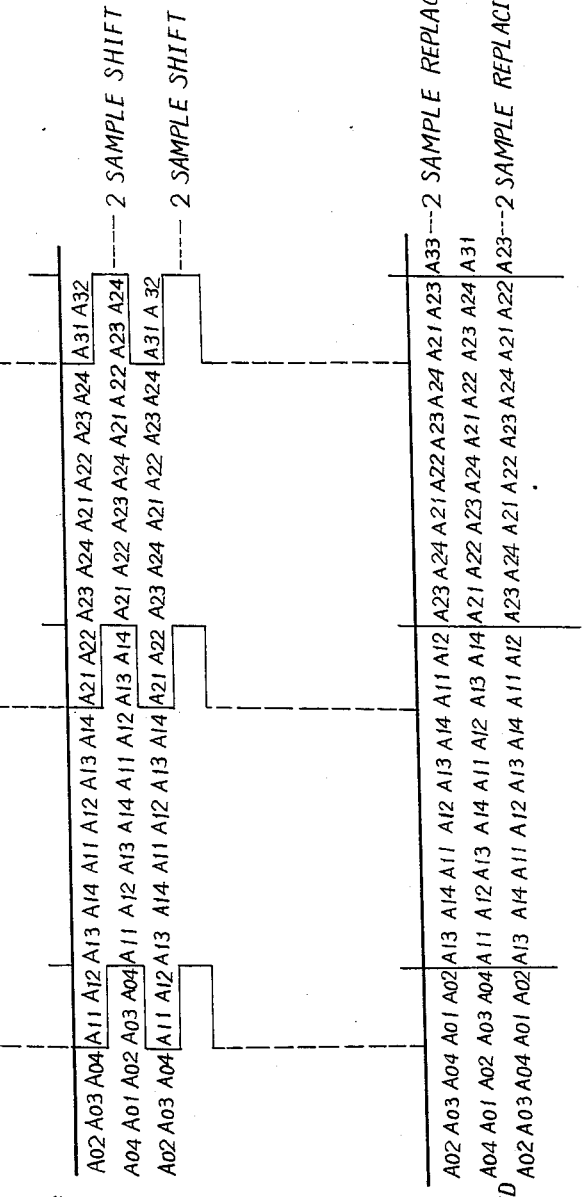
FIGS. 4A, 4B and 4C are diagrams showing an example of the operation of the circuit of FIG. 1.

FIGS. 4A, 4B and 4C show an example of an actual operation of the circuit controlled in the above manner. FIG. 4A is a diagram of a composite signal input in which A11, A12, ..., B11, B12, ..., C11, C12, ... are samples of respective scanning lines. FIG. 4B is a diagram showing the operation in which the first 4 samples of the first scanning line are repeated once in the block at each scanning line, and shifted by 2 samples in every other scanning line. FIG. 4C is a diagram showing that the first 2 samples in the scanning line in which data shifting is not made in the block are replaced with the former half of the repeated data of the immediately preceding block. In this manner, the mosaic picture in which color inversion and occurrence of notches at the border are prevented is obtained.

As described above, in the phase difference detection circuit 50, whether the sample to be repeated should be taken from the first scanning line or the last scanning line of the block is selected in accordance with the difference between the write address and the read address, and this selection is needed for the following reasons.

As shown in FIG. 5A, in case that writing in the block is performed while the block scanning is made (i.e. the write address is located within one block after the read address), if the first 4 samples of the first scanning line are repeated in this block, the data of the first 4 samples of the first scanning line is replaced in the middle to cause the ploblem that the picture is changed during the block. Therefore, in this case, the change of the picture is prevented by repeating the data of the first 4 samples of the last scanning line as shown in FIG. 5B. That is, if the condition $Sr-Sw<N$ (N: total number of the scanning lines in the blick and $Sr>Sw$) is satisfied, the phase difference detection circuit 50 designates repeated use of the data of the 4 samples of the last scanning line of the block, and if not, the circuit 50 designates repeated use of the data of the 4 samples of the first scanning line in the block.

The embodiment of FIG. 1 is so constructed that a composite signal passes through the circuit even during the nomal playback mode. In this case, the switches 30, 34, 42 are connected to the contact B and the switch 38 is connected to the contact A. In the switch 26, as in reproducing the mosaic picture, the write address and the read address are switched respectively once in one sample. The composite video signal thereby is read out sequentially as it is after being memorized in the field memory 22 so that a mosaic picture is not generated but a nomal picture is reproduced. Additionally, in the nomal playback mode, it is possible to produce a composite video signal by providing another by-pass channel without causing it to pass through the circuit of FIG. 1.

In the above embodiment, the number of data corresponding to one wave of color burst is 4 samples. However, the number is not limited to 4 but may be any other number so long as it is an even number.

This embodiment has been described on the assumption that the block is divided into the width in which the data is repeated once in the direction of the scanning line (i.e. width of 8 samples). If, however, the data is repeated more, a mosaic picture from larger blocks will be obtained.

As described above, according to this invention, a mosaic picture can be generated by using a composite video signal and the construction of the circuit can be simplified compared to a case in which a component signal is used.

What is claimed is:

1. A mosaic picture generation circuit comprising:
   means for writing an analog-to-digital converted signal of a composite video signal in a memory;
   means for reading out data of one wave of color burst to be repeated in each mosaic block each time said block is scanned;
   means for repeatedly outputting the read out data on the same scanning line and in the same block;
   means for shifting the output data in the same block by half wave of color burst every other scanning line;
   means for replacing data of half wave of first color burst on a scanning line on which said shifting is not made with former half data of the data of one wave of color burst to be repeated in an immediately preceding block; and
   means for delivering out the output data after digital-to-analog conversion.

2. A mosaic picture generation circuit as defined in claim 1 wherein the data of one wave of color burst consists of four samples.

3. A mosaic picture generation circuit as defined in claim 1 wherein data on last scanning line in a block is used as the data of one wave of color burst to be repeated in each mosaic block when difference between read address Sr and write address Sw is $Sr-Sw<N$ (where N representing total number of scanning lines and $Sr>Sw$) and otherwise data of the first scanning line in the block is used as the data of one wave of color burst to be repeated in each mosaic block.

* * * * *